(12) United States Patent
Willert

(10) Patent No.: US 10,334,836 B2
(45) Date of Patent: Jul. 2, 2019

(54) INSECT TRAP AND METHOD OF MAKING SAME

(71) Applicant: Willert Home Products, Inc., Saint Louis, MO (US)

(72) Inventor: Bryan Bruce Willert, Saint Louis, MO (US)

(73) Assignee: Willert Home Products, Inc., St. Louis, MO (US)

( * ) Notice: Subject to any disclaimer, the term of this patent is extended or adjusted under 35 U.S.C. 154(b) by 271 days.

(21) Appl. No.: 15/595,468

(22) Filed: May 15, 2017

(65) Prior Publication Data

US 2018/0325089 A1    Nov. 15, 2018

(51) Int. Cl.
*A01M 1/02* (2006.01)
*A01M 1/10* (2006.01)

(52) U.S. Cl.
CPC .............. *A01M 1/106* (2013.01); *A01M 1/02* (2013.01); *A01M 1/10* (2013.01); *A01M 2200/012* (2013.01)

(58) Field of Classification Search
CPC ... A01M 1/106; A01M 1/10; A01M 2200/012
USPC .......................................................... 43/133
See application file for complete search history.

(56) References Cited

U.S. PATENT DOCUMENTS

| 3,271,894 | A | * | 9/1966 | Manno | A01K 69/08 |
| | | | | | 43/100 |
| 3,320,692 | A | * | 5/1967 | Hellen | A01M 23/16 |
| | | | | | 43/131 |
| 4,706,410 | A | * | 11/1987 | Briese | A01M 1/02 |
| | | | | | 43/107 |
| 4,873,787 | A | * | 10/1989 | Schneidmiller | A01M 1/02 |
| | | | | | 43/122 |
| 4,899,485 | A | * | 2/1990 | Schneidmiller | A01M 1/02 |
| | | | | | 43/107 |
| 4,986,024 | A | | 1/1991 | Peek et al. | |
| 5,226,254 | A | | 7/1993 | MacMenigall | |
| 5,359,808 | A | * | 11/1994 | Fitsakis | A01M 1/2016 |
| | | | | | 43/131 |
| 5,392,558 | A | * | 2/1995 | Blomquist | A01M 1/02 |
| | | | | | 43/107 |
| 6,112,452 | A | * | 9/2000 | Campbell | A01M 1/02 |
| | | | | | 215/319 |
| 6,158,165 | A | | 12/2000 | Wilson | |
| 6,609,329 | B2 | | 8/2003 | McCallum | |
| 6,910,298 | B2 | | 6/2005 | Schneidmiller | |
| 7,093,389 | B1 | | 8/2006 | Meier et al. | |
| 7,100,324 | B2 | | 9/2006 | Lenker | |

(Continued)

OTHER PUBLICATIONS

"Big Bag Fly Trap", Rescue!, retrieved from https://www.rescue.com/products/traps/big-bag-fly-trap/.

(Continued)

*Primary Examiner* — Christopher P Ellis
(74) *Attorney, Agent, or Firm* — Armstrong Teasdale LLP

(57) ABSTRACT

An insect trap is provided. The insect trap includes a flexible bag having a first edge and a second edge that are connected together at a seam. The insect trap also includes a nozzle secured between the edges adjacent the seam. The nozzle has a tube defining a passageway for insects into the bag and a fin providing a transition for the edges extending over the tube from the seam.

20 Claims, 4 Drawing Sheets

(56) References Cited

U.S. PATENT DOCUMENTS

| | | | | |
|---|---|---|---|---|
| 7,222,453 B2 * | 5/2007 | Uhl | .......................... | A01M 1/04 |
| | | | | 222/81 |
| 7,290,368 B2 * | 11/2007 | Rich | ...................... | A01M 1/02 |
| | | | | 43/107 |
| 7,503,142 B1 * | 3/2009 | Uhl | .......................... | A01M 1/04 |
| | | | | 141/331 |
| 7,694,456 B1 | 4/2010 | Curtis | | |
| 2006/0137240 A1 * | 6/2006 | Dismore | ................. | A01M 1/10 |
| | | | | 43/107 |
| 2012/0151821 A1 | 6/2012 | Kovacs et al. | | |

OTHER PUBLICATIONS

"POP! Fly Trap", Rescue!, retrieved from https://www.rescue.comtproducts/traps/pop-fly-trap/.

"Starbar Giant Fly Relief Disposable Trap Bag", Famam Home and Garden, retrieved from https://www.amazon.com/Farnam-Garden-100504346-Starbar-Disposableidp/B005LLRRCW?

* cited by examiner

INSECT TRAP AND METHOD OF MAKING SAME

BACKGROUND OF THE DISCLOSURE

The subject matter described herein relates generally to an insect trap and, more particularly, to a trap for flying insects and a method of making the same.

It is common for flying insect traps to include a container and a port coupled to the container. The container houses a substance that attracts flying insects to the port, and the port is designed to permit insects to enter the container while inhibiting their exit from the container. Thus, flying insects that enter the container tend to become trapped therein, and ultimately perish inside the container.

Some such traps have a container that is a flexible bag and a port that is a rigid structure. As such, the exterior shape of the port can make it difficult to couple the bag to the port in a manner that seals the insect attractant inside the bag until the trap is deployed. More specifically, the exterior geometry of the port can make it difficult to seat the bag flush against the port without air gaps being present at the interface of the bag and the port.

BRIEF DESCRIPTION OF THE DISCLOSURE

In one aspect, an insect trap is provided. The insect trap includes a flexible bag having a first edge and a second edge that are connected together at a seam. The insect trap also includes a nozzle secured between the edges adjacent the seam. The nozzle has a tube defining a passageway for insects into the bag and a fin providing a transition for the edges extending over the tube from the seam.

In another aspect, a method of making an insect trap is provided. The method includes positioning a nozzle between a first edge and a second edge of a flexible bag, wherein the first edge and the second edge define an opening of the bag. The method also includes connecting the first edge to the second edge to form a seam and to secure the nozzle between the edges adjacent the seam such that a tube of the nozzle defines a passageway for insects into the bag and such that a fin of the nozzle provides a transition for the edges extending over the tube from the seam.

In another aspect, a nozzle for an insect trap having a flexible bag with a first edge and a second edge that are connectable together at a seam is provided. The nozzle includes a tube defining a passageway for insects into the bag. The nozzle also includes a fin providing a transition for the edges extending over the tube from the seam when the nozzle is secured between the edges adjacent the seam.

DETAILED DESCRIPTION OF THE DISCLOSURE

The exemplary embodiments described herein provide an apparatus that is useful for trapping flying insects such as nuisance flies, but could also be used against other types of insects and/or animals. More specifically, the apparatus is a trap that lures flying insects into a bag via a nozzle, wherein the nozzle is constructed to inhibit the insects from exiting the bag via the nozzle. The bag is constructed to stand upright on a support surface when partly filled with liquid, and the nozzle is coupled to the bag such that the nozzle is oriented in manner that assists the bag in remaining upright during deployment. Moreover, the nozzle is shaped to facilitate better connection (e.g., a sealed connection) of the bag to the nozzle when the bag is closed around the nozzle. Particularly, the nozzle has fins that enable a smoother transition of the bag over a tube of the nozzle, thereby reducing gaps between the bag and the nozzle when the bag is attached to the nozzle.

Figure 1:
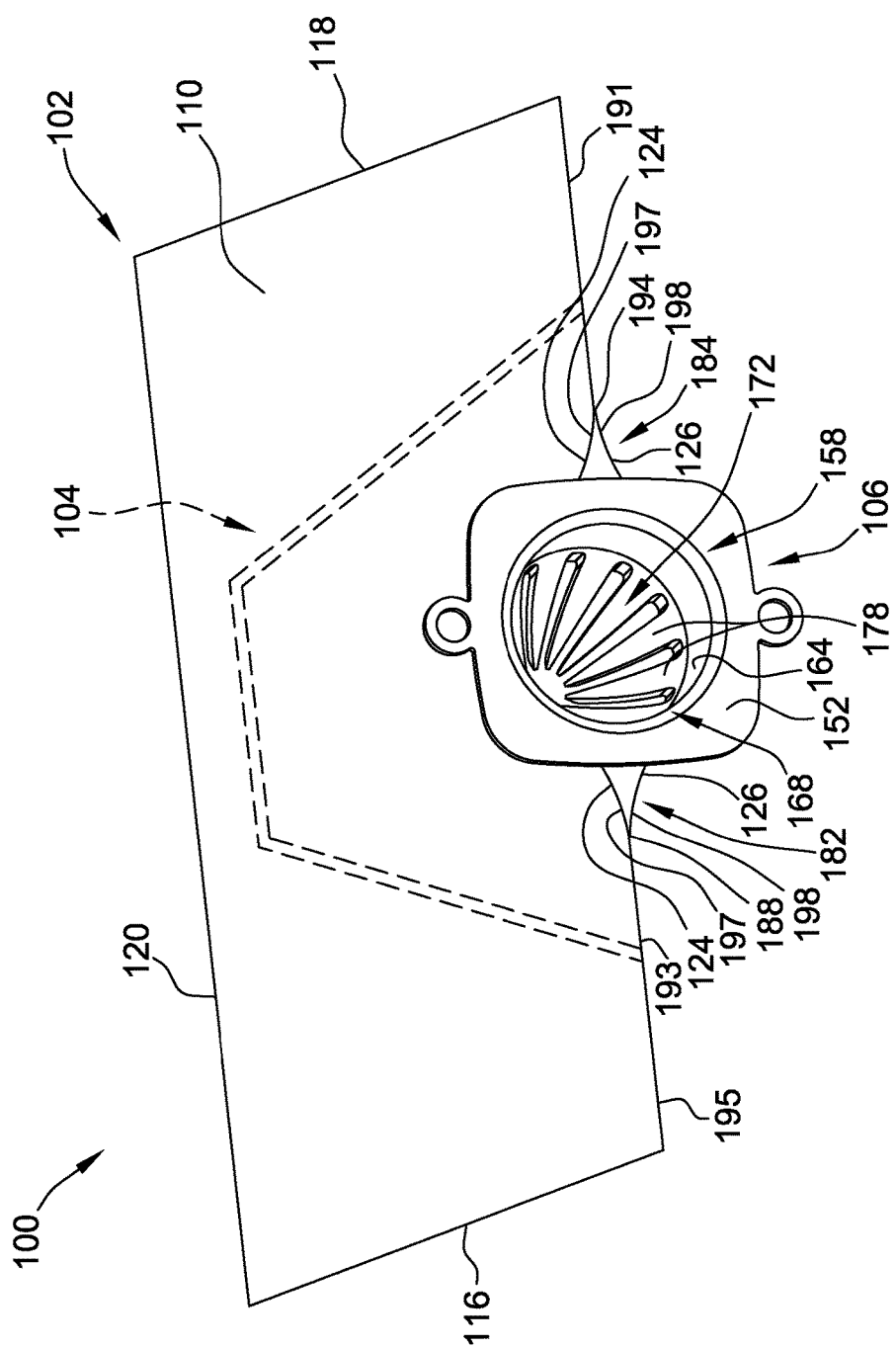
FIG. 1 is a perspective view of an exemplary insect trap.

FIG. 1 is a perspective view of an exemplary trap 100 for flying insects. In the exemplary embodiment, trap 100 includes a flexible bag 102, a frame 104 disposed within bag 102, and a nozzle 106 coupled to bag 102 such that nozzle 106 provides access into bag 102 for flying insects. Although trap 100 has only one bag 102 and only one nozzle 106 in the exemplary embodiment, trap 100 may have any suitable number of bags each with any suitable number of nozzles coupled thereto in other embodiments.

Figure 2:
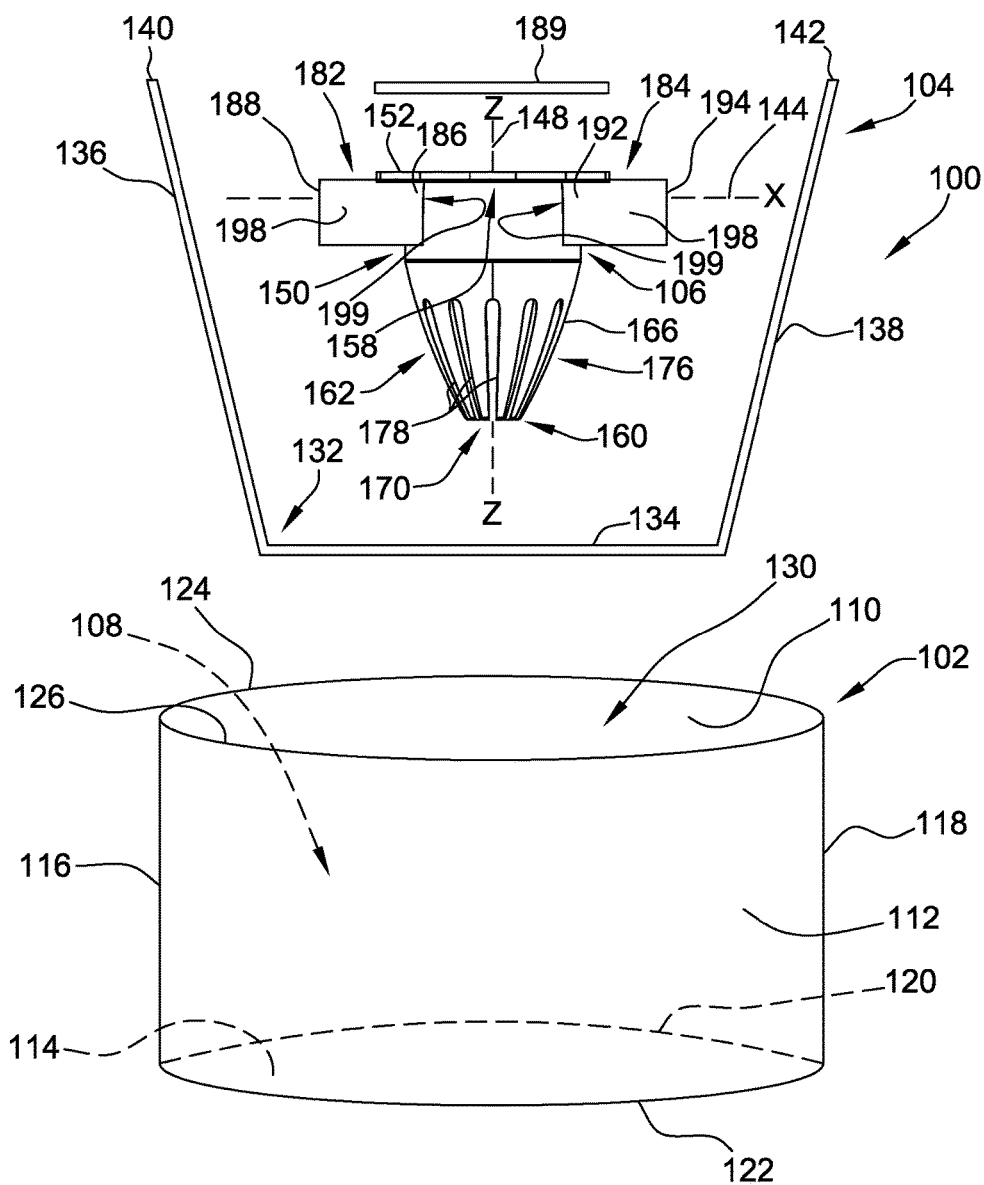
FIG. 2 is an exploded view of the trap shown in FIG. 1.

FIG. 2 is an exploded (or pre-assembled) view of trap 100. In the exemplary embodiment, bag 102 is fabricated from a flexible plastic material, such that bag 102 has a collapsed state (shown in FIG. 1) and an expanded state (shown in FIG. 2). The plastic material of bag 102 is at least in part transparent or translucent such that an interior space 108 of bag 102 is viewable from the exterior of bag 102. Bag 102 has a first side panel 110, a second side panel 112, and a bottom panel 114. First side panel 110 is connected to second side panel 112 at a first seam 116 and at a second seam 118. First side panel 110 is connected to bottom panel 114 at a third seam 120, and second side panel 112 is connected to bottom panel 114 at a fourth seam 122. Notably, each seam 116, 118, 120, 122 may be formed using any suitable panel-connecting technique (e.g., an adhesive bonding technique and/or thermal technique).

In the exemplary embodiment, first side panel 110 has a first top edge 124, and second side panel 112 has a second top edge 126, such that first top edge 124 and second top edge 126 together define a top opening 130 of bag 102. Although, when bag 102 is in its expanded state, top opening 130 and bottom panel 114 are both generally oval-shaped in the exemplary embodiment, top opening 130 and bottom panel 114 may have any suitable shapes in other embodiments when bag 102 is in its expanded state. For example, top opening 130 and bottom panel 114 may have different shapes relative to one another in some embodiments. Furthermore, although bag 102 is fabricated from a plastic material in the exemplary embodiment, bag 102 may in some embodiments be fabricated from any suitable material that facilitates enabling bag 102 to function as described herein (e.g., bag 102 may be made from a foil material in some embodiments). Additionally, although bag 102 is fabricated from a material that is at least in part transparent or translucent in the exemplary embodiment, bag 102 may have any suitable capacity for light penetration in other embodiments (e.g., bag 102 may be entirely opaque in other embodiments). Moreover, although bag 102 has three panels 110, 112, 114 in the exemplary embodiment, bag 102 may have any suitable number of panels in other embodiments (e.g., bag 102 may have a single-piece side panel that envelops interior space 108, rather than having separate side panels 110, 112 that are joined together at seams 116, 118).

In the exemplary embodiment, frame 104 includes a rigid wire 132 that is generally U-shaped. More specifically, wire 132 is shaped (e.g., bent) to define a base member 134, a first riser (or arm) 136 extending obliquely from base member 134, and a second riser (or arm) 138 extending obliquely from base member 134 opposite first riser 136. First riser 136 has a distal end 140, and second riser 138 has a distal end 142. In other embodiments, frame 104 may have any suitable arrangement of support members that facilitates enabling frame 104 to function as an internal support for bag 102 in the manner described herein. For example, in one embodiment, wire 132 may not be generally U-shaped but, rather, may have the shape of a square or rectangle. In another example, frame 104 may have a plurality of wires that are coupled together in a suitable manner. Alternatively, trap 100 may not have frame 104 inside its bag 102 in some embodiments (e.g., trap 100 may instead have an external frame, or no frame at all).

Figure 3:
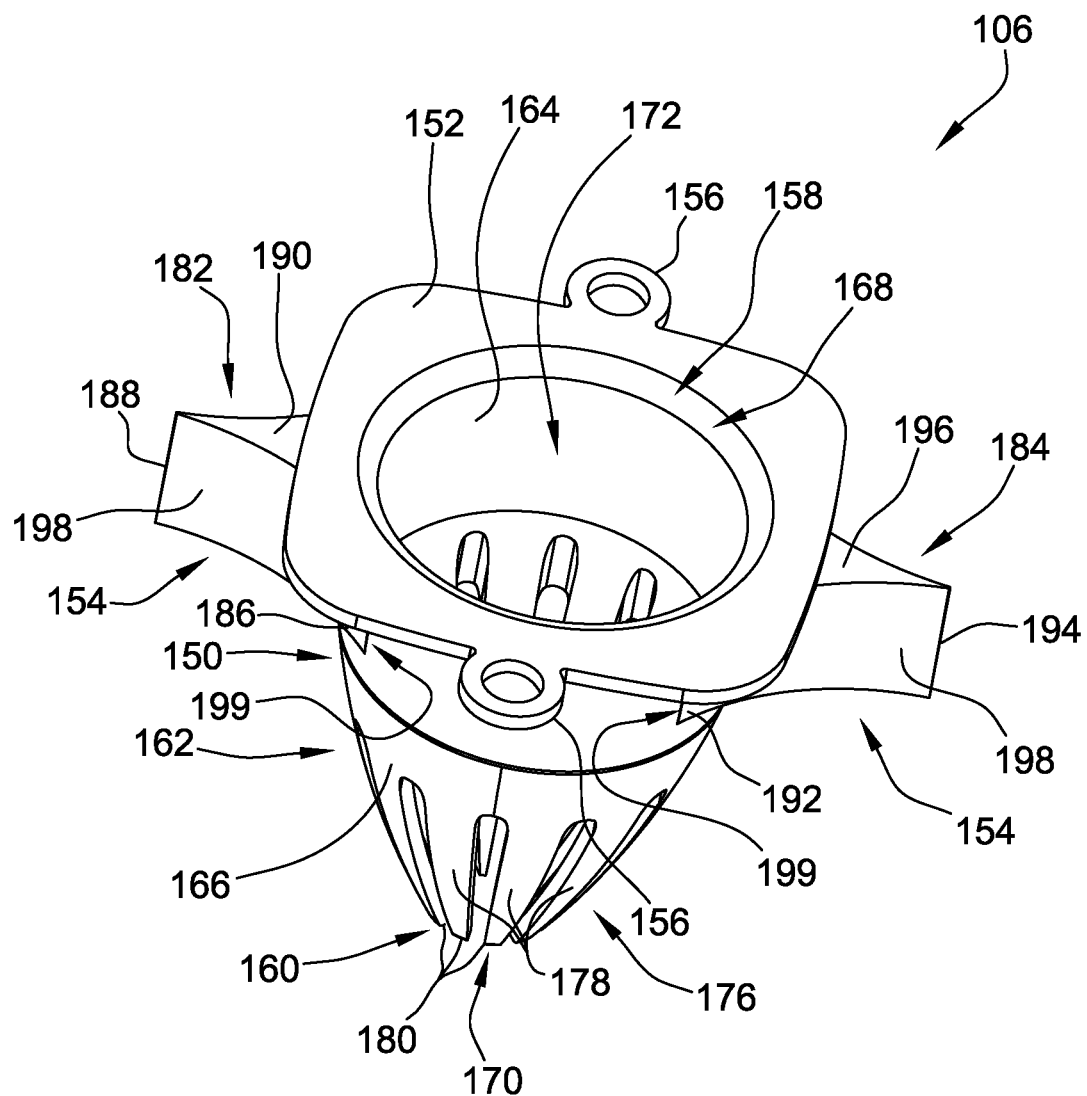
FIG. 3 is a perspective view of a nozzle of the trap shown in FIG. 2.
Figure 4:
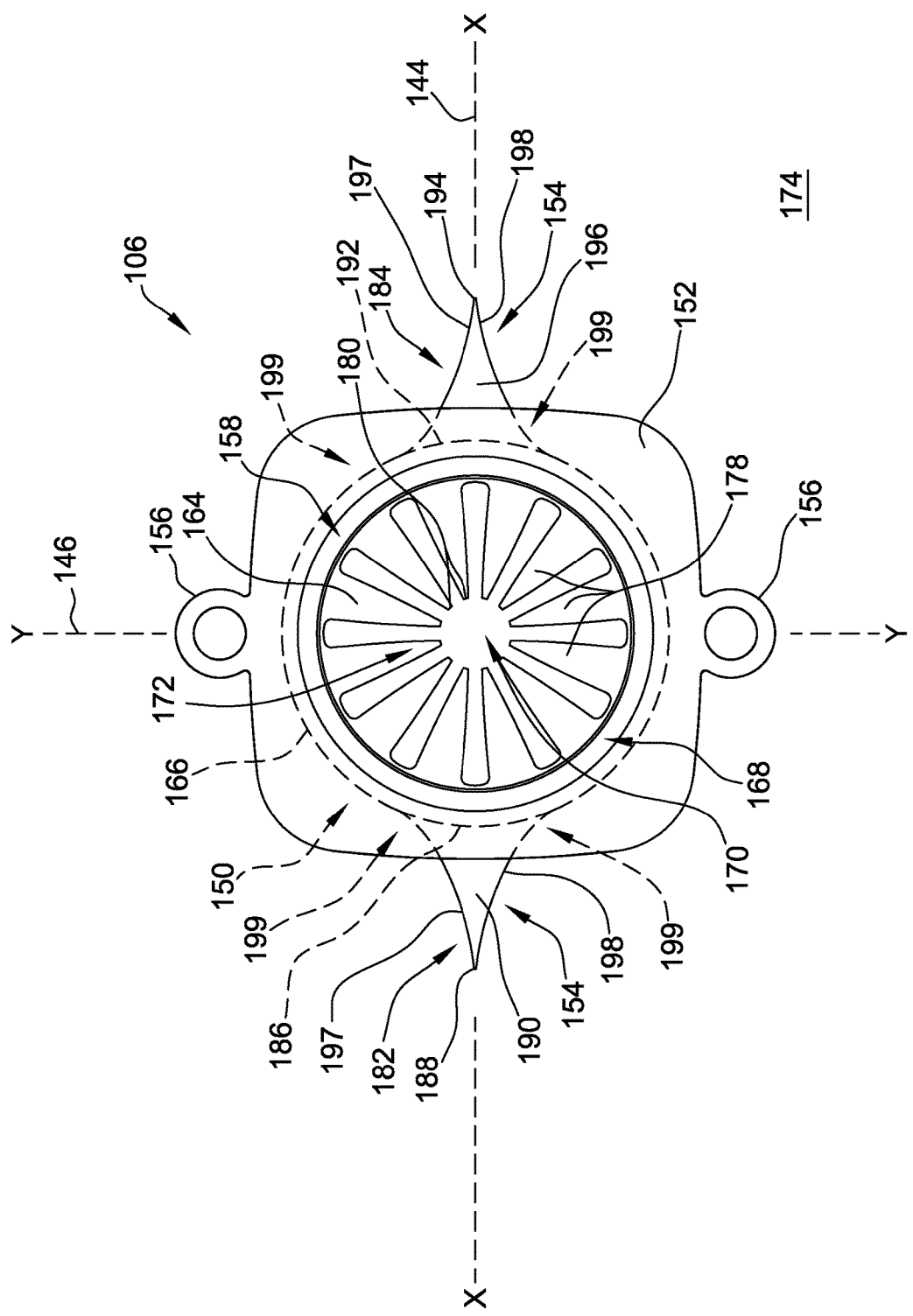
FIG. 4 is a top view of the nozzle shown in FIG. 3.

FIGS. 3 and 4 are perspective and top views, respectively, of nozzle 106. Nozzle 106 is illustrated in a three-dimensional space defined by an X-axis 144, a Y-axis 146, and a Z-axis 148 (shown in FIG. 2). In the exemplary embodiment, nozzle 106 includes a tube 150, a flange 152, at least one fin 154, and at least one eyelet 156 that are all made from a rigid plastic material and are integrally formed together as a single-piece, unitary structure. Although flange 152 has a substantially square planform shape in the exemplary embodiment (as shown in FIG. 4), flange 152 may have any suitable shape in other embodiments (e.g., flange 152 may have a substantially rectangular or substantially oval planform shape in some embodiments). Moreover, in other embodiments, nozzle 106 may be made from any suitable material (e.g., a material other than a rigid plastic), and nozzle 106 may not be a single-piece, unitary structure wherein tube 150, flange 152, fin(s) 154, and eyelet(s) 156 are integrally formed together. For example, flange 152, fin(s) 154, and/or eyelet(s) 156 may be formed separately from, and coupled to, tube 150 and/or one another using a suitable fastener (e.g., a mechanical fastener or an adhesive fastener). Alternatively, nozzle 106 may not have eyelet(s) 156 in some embodiments.

In the exemplary embodiment, tube 150 has a top end 158, a bottom end 160, and a body 162 extending from top end 158 to bottom end 160. Body 162 has an interior surface 164 and an exterior surface 166, each of which has a substantially annular top-down profile (as shown in FIG. 4). Interior surface 164 defines an inlet 168, an outlet 170, and a passageway 172 extending from inlet 168 to outlet 170. Inlet 168 is wider than outlet 170 such that interior surface 164 has a shape that is substantially like an inverted frustum (i.e., interior surface 164 is substantially frustoconical). Tube 150 is oriented such that flange 152 extends outward from exterior surface 166 of tube 150 along a plane 174 defined by X-axis 144 and Y-axis 146. In this manner, passageway 172 extends along Z-axis 148, such that Z-axis 148 acts as a centerline axis of passageway 172. Optionally, in some embodiments, at least part of interior surface 164 and/or exterior surface 166 may not have a substantially annular top-down profile (e.g., at least part of interior surface 164 and/or exterior surface 166 may have a substantially square or rectangular top-down profile). In other embodiments, interior surface 164 may not be substantially frustoconical. For example, interior surface 164 may be shaped such that inlet 168 and outlet 170 have substantially the same size and shape (e.g., interior surface 164 may be substantially cylindrical from inlet 168 to outlet 170). Alternatively, although interior surface 164 circumscribes Z-axis 148 in the exemplary embodiment, interior surface 164 may have any suitable shape relative to Z-axis 148 in other embodiments (e.g., Z-axis 148 may not serve as a centerline axis for passageway 172 in some embodiments, but rather Z-axis 148 may be skewed relative to (i.e., may cut across) passageway 172).

Notably, a bottom part 176 of body 162 is designed to impair the vision of a flying insect (e.g. a nuisance fly such as a house fly, a blue bottle fly, a blow fly, or a canyon fly) attempting to enter passageway 172 via outlet 170. In the exemplary embodiment, bottom part 176 impairs the insect's vision by virtue of being perforated, in that bottom part 176 has a plurality of circumferentially spaced fingers 178 that converge toward outlet 170. Each finger 178 has a distal end 180, such that distal ends 180 collectively circumscribe and define outlet 170. In other embodiments, tube 150 may be perforated in any suitable manner that facilitates enabling tube 150 to perform a vision-impairing function as described herein. For example, in one embodiment, bottom part 176 may not be perforated by virtue of having fingers 178 that are spaced apart about Z-axis 148 but, rather, may instead be perforated by virtue of a mesh-like arrangement of wires (not shown) or beams (not shown). Alternatively, tube 150 may not be designed to perform its vision-impairing function by virtue of its structural configuration, but may instead have an aesthetic (or non-structural) characteristic (e.g., surface texture, color, smell, etc.) that is designed to impair the ability of a flying insect to enter passageway 172 via outlet 170.

In the exemplary embodiment, fin(s) 154 extend outward from tube 150 beneath flange 152 along X-axis 144. Fin(s) 154 include a first fin 182 and a second fin 184 that are substantially identical. More specifically, first fin 182 has a base 186, a leading edge 188, and a body 190 that tapers from base 186 to leading edge 188. Likewise, second fin 184 has a base 192, a leading edge 194, and a body 196 that tapers from base 192 to leading edge 194. Each leading edge 188, 194 is oriented substantially parallel to Z-axis 148, and each body 190, 196 has a first side surface 197 and a second side surface 198 that face away from one another and curve arcuately inward toward one another as they taper from their respective bases 186, 192 toward their respective leading edges 188, 194. Notably, each side surface 197, 198 blends continuously with exterior surface 166 of tube body 162 at a respective transition region 199 that is substantially free of corners, cusps, and other discontinuities. In some embodiments, nozzle 106 may have any suitable number of fins 154 arranged, shaped, and oriented in any suitable manner that facilitates enabling fins 154 to function as described herein. For example, leading edges 188, 194 may not be oriented substantially parallel to Z-axis 148 in some embodiments, and surfaces 197, 198 of each fin 154 may not curve arcuately inward toward one another in other embodiments.

Referring back to FIG. 2, when assembling trap 100, a removable cover 189 (e.g., a peelably removable cover such as a foil) is coupled to flange 152 over inlet 168, thereby providing a temporary seal of inlet 168. Also, a lure (not shown) for a flying insect (e.g., a powder-form lure) is placed within interior space 108 of bag 102 via top opening 130, and frame 104 is likewise inserted into interior space 108 of bag 102 via top opening 130, such that base member 134 faces bottom panel 114 of bag 102 and such that distal ends 140, 142 of risers 136, 138 face top opening 130 of bag 102. Nozzle 106 is then positioned in top opening 130 of bag 102 with bottom part 176 of tube 150 disposed inside interior space 108 of bag 102, such that flange 152 is disposed on the exterior of bag 102, and such that first fin 182 is oriented toward first seam 116 with second fin 184 oriented toward second seam 118 (i.e., fins 182, 184 are oriented in substantially opposite directions). First top edge 124 and second top edge 126 are then connected (e.g., adhesively bonded or thermally bonded) to one another and to nozzle 106, thereby gripping nozzle 106 to secure nozzle 106 on bag 102 and define a top seam 195 (shown in FIG. 1) of bag 102 adjacent nozzle 106. Moreover, securing nozzle 106 at top seam 195 of bag 102 rather than at the bottom of bag 102 similar to at least some known insect traps enables trap 100 to stand upright during deployment and/or while on display for sale (e.g., on a store shelf).

With reference now to FIG. 1, top seam 195 has a first segment 193 and a second segment 191 that are separated by nozzle 106. In this manner, top edges 124, 126 are connected to one another and to nozzle 106 such that top opening 130 is closed (e.g., sealed) around nozzle 106, thereby making interior space 108 accessible to insects only through passageway 172 of nozzle 106. More specifically, first top edge 124 extends from first segment 193 of top seam 195 to second segment 191 of top seam 195 across (and in sealed attachment with) first surface 197 of first fin 182, exterior surface 166 (shown in FIGS. 2-4) of tube 150, and first surface 197 of second fin 184. Likewise, second top edge 126 extends from first segment 193 of top seam 195 to second segment 191 of top seam 195 across (and in sealed attachment with) second surface 198 of first fin 182, exterior surface 166 of tube 150, and second surface 198 of second fin 184. Notably, because each fin 182, 184 is tapered from its respective base 186, 192 (shown in FIGS. 2-4) toward its respective leading edge 188, 194 and because surfaces 197, 198 blend continuously with exterior surface 166 of tube 150 at transition regions 199, side panels 110, 112 of bag 102 are able to transition smoothly between segments 191, 193 of top seam 195 over nozzle 106 in a manner that substantially mirrors the contours of nozzle 106, thus reducing gaps at the interface of edges 124, 126 and nozzle 106. This facilitates a substantially airtight coupling of nozzle 106 to bag 102, thereby sealing the insect attractant inside bag 102 until trap 100 is deployed.

To deploy trap 100, cover 189 is removed from flange 152 to expose inlet 168 (and, thus, interior space 108 of bag 102) to the ambient via passageway 172. A liquid (e.g., water) is then poured into bag 102 via inlet 168 such that the liquid contacts (e.g., mixes with) the lure inside interior space 108 of bag 102. Bag 102 is partly filled with liquid such that side panels 110, 112 flex outward, thereby converting bag 102 into its expanded state. Base member 134 of frame 104 is thus seated against bottom panel 114, and top seam 195 thus seats against distal ends 140, 142 of risers 136, 138 of frame 104. In this manner, trap 100 can stand upright on a support surface (not shown) (e.g., the ground or a table near a garbage can, a compost pile, an animal stable, or anywhere else where the trapping of insects is desired). Alternatively, trap 100 can be hung from a suitable structure (e.g., a tree branch) using a thread, at least one end of which is tied to eyelet(s) 156.

Because air can enter and exit interior space 108 of bag 102 via nozzle 106, the lure attracts insects to nozzle 106, through which insects enter interior space 108 of bag 102. Due to the configuration of bottom part 176 of tube 150 (i.e., due to the visual pattern formed by fingers 178), insects that enter bag 102 through nozzle 106 have difficulty exiting bag 102 through nozzle 106. More specifically, once an insect enters interior space 108 from passageway 172 via outlet 170, the insect has difficulty visually locating outlet 170 and reentering passageway 172 from interior space 108. Thus, insects that enter interior space 108 of bag 102 tend to remain trapped inside bag 102 until they perish, at which point the insects submerge into the liquid such that the liquid mitigates the associated scent. After deployment, trap 100 can be disposed of as desired, and replaced with a new trap 100 that is deployable as set forth above.

The methods and systems described herein facilitate providing a trap for flying insects. More specifically, the methods and systems facilitate providing a trap that lures flying insects into a bag via a nozzle, wherein the nozzle is constructed to inhibit the insects from exiting the bag via the nozzle. The methods and systems also facilitate providing a bag that is constructed to stand upright on a support surface when partly filled with liquid, and the methods and systems further facilitate coupling a nozzle to the bag such that the nozzle is oriented in manner that assists the bag in remaining upright during deployment. Moreover, the methods and system also facilitate providing a nozzle that is shaped to facilitate better connection (e.g., sealing connection) of the bag to the nozzle when the bag is closed around the nozzle. Particularly, the methods and systems facilitate providing a nozzle with fins that enable a smoother transition of the bag over a tube of the nozzle, thereby reducing gaps between the bag and the nozzle when the bag is attached to the nozzle.

Exemplary embodiments of an insect trap are described above in detail. The trap described herein is not limited to the specific embodiments described herein, but rather, components of the trap may be utilized independently and separately from one another. For example, the trap described herein may have other applications not limited to practice in trapping flying insects, as described herein. Rather, the trap described herein can be implemented and utilized in connection with trapping other types of insects (or animals generally).

This written description uses example embodiments, while disclosing the best mode and enabling any person skilled in the art to practice the example embodiments, including making and using any devices or systems and performing any incorporated methods. The patentable scope of this disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An insect trap comprising:
   a flexible bag having a first edge and a second edge that are connected together at a seam; and
   a nozzle secured between the edges adjacent the seam, wherein the nozzle comprises a tube defining a passageway for insects into the bag and a fin providing a transition for the edges extending over the tube from the seam.

2. An insect trap in accordance with claim 1, wherein the fin comprises a base and a leading edge such that the fin tapers from the base toward the leading edge.

3. An insect trap in accordance with claim 2, wherein the fin comprises a side surface that curves arcuately from the base toward the leading edge.

4. An insect trap in accordance with claim 1, wherein the nozzle has a pair of said fins oriented in substantially opposite directions.

5. An insect trap in accordance with claim 1, wherein the bag is shaped to stand upright when partly filled with a liquid.

6. An insect trap in accordance with claim 5, further comprising a frame disposed within the bag to support the bag when standing upright.

7. An insect trap in accordance with claim 1, wherein the tube comprises a bottom part disposed within the bag, the bottom part having a plurality of fingers spaced apart from one another about the passageway.

8. A method of making an insect trap, said method comprising:
   positioning a nozzle between a first edge and a second edge of a flexible bag, wherein the first edge and the second edge define an opening of the bag; and
   connecting the first edge to the second edge to form a seam and to secure the nozzle between the edges adjacent the seam such that a tube of the nozzle defines a passageway for insects into the bag and such that a fin of the nozzle provides a transition for the edges extending over the tube from the seam.

9. A method in accordance with claim 8, further comprising forming the fin with a base and a leading edge such that the fin tapers from the base toward the leading edge.

10. A method in accordance with claim 9, further comprising forming the fin with a side surface that curves arcuately from the base toward the leading edge.

11. A method in accordance with claim 8, further comprising forming the nozzle with a pair of fins oriented in substantially opposite directions.

12. A method in accordance with claim 8, further comprising forming the bag to stand upright when partly filled with a liquid.

13. A method in accordance with claim 12, further comprising inserting a frame into the bag to support the bag when standing upright.

14. A method in accordance with claim 8, further comprising forming the tube with a bottom part having a plurality of fingers spaced apart from one another about the passageway.

15. A nozzle for an insect trap having a flexible bag with a first edge and a second edge that are connectable together at a seam, said nozzle comprising:
   a tube defining a passageway for insects into the bag; and
   a fin providing a transition for the edges extending over the tube from the seam when the nozzle is secured between the edges adjacent the seam.

16. A nozzle in accordance with claim 15, wherein the fin comprises a base and a leading edge such that the fin tapers from the base toward the leading edge.

17. A nozzle in accordance with claim 16, wherein the fin comprises a side surface that curves arcuately from the base toward the leading edge.

18. A nozzle in accordance with claim 15, wherein the nozzle comprises a pair of fins oriented in substantially opposite directions.

19. A nozzle in accordance with claim 15, wherein the tube comprises a bottom part for insertion within the bag, the bottom part having a plurality of fingers spaced apart from one another about the passageway.

20. A nozzle in accordance with claim 15, further comprising a flange extending from the tube, the fin disposed beneath the flange.

* * * * *